*J. G. Baker.*
*Turning Lathe.*
Nº 44,915.        Patented Nov. 1, 1864.
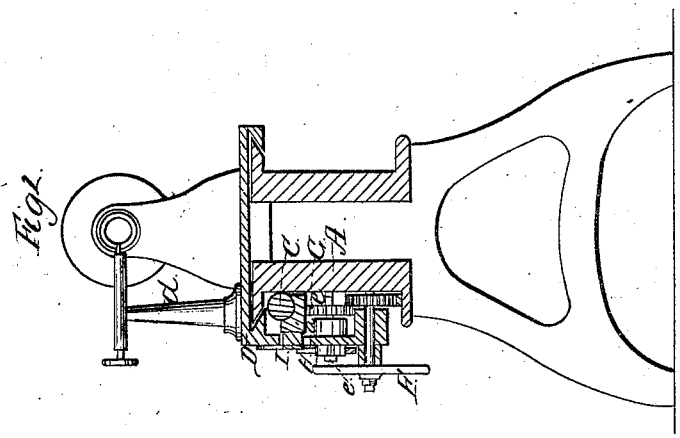
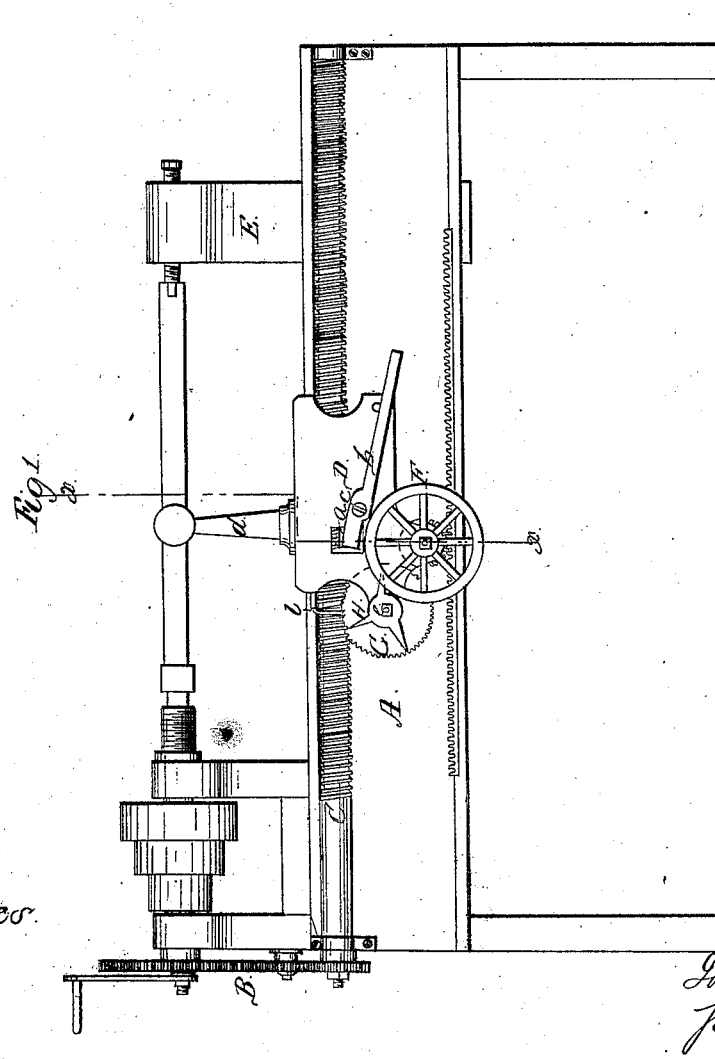

UNITED STATES PATENT OFFICE.

JOHN G. BAKER, OF PHILADELPHIA, PA., ASSIGNOR TO HIMSELF, THOMAS S. DISSTON, AND THOMAS H. ASBURY, OF SAME PLACE.

IMPROVEMENT IN TURNING-LATHES.

Specification forming part of Letters Patent No. 44,915, dated November 1, 1864.

*To all whom it may concern:*

Be it known that I, JOHN G. BAKER, of Philadelphia, in the county of Philadelphia and State of Pennsylvania, have invented a new and useful Improvement in Turning-Lathes; and I do hereby declare that the following is a full, clear, and exact description thereof, which will enable others skilled in the art to make and use the same, reference being had to the accompanying drawings, forming part of this specification, in which—

Figure 1 represents a front elevation of this invention. Fig. 2 is a transverse vertical section of the same, the plane of section being indicated by the line $x\ x$, Fig. 1.

Similar letters of reference indicate like parts.

In cutting screw-threads by means of a slide-lathe it is the common practice to keep the main screw of the lathe constantly in gear with the slide, and to reverse the motion of the slide by throwing one belt off and another on. The slide, therefore, is run both ways—backward as well as forward—by the action of the screw, which causes considerable loss of time, or, if it is attempted to run the slide back by hand, it is difficult to bring the tool to bear on the correct spot.

The object of this invention is to enable the workman to run the slide back by hand and to lock it at the proper point, so that the tool will always start right.

The invention consists in the employment or use of a worm-wheel, or of other suitable gear, the number of teeth of which is a multiple of the number of threads in the running inch of the screw, and which gears in or connects with the screw, and is used in combination with a dial and index in such a manner that by said index the workman is enabled at all times (except for some fractional screws) to determine the correct position of the tool and lock the carriage at the proper point without fail.

A represents the frame or shears of an ordinary turning-lathe, provided with a suitable gear, B, and screw, C, and with a carriage or slide, D, all arranged in the usual manner of lathes for cutting screws. The slides connect with the screw C by a semi-nut, $a$, which is secured to one end of a hand-lever, $b$, connected to the front plate of the slide by a fulcrum-pin, $c$. By depressing the outer end of this hand-lever the nut $a$ is thrown in gear with the screw, and if the screw rotates a longitudinal sliding motion is imparted to said slide. It is obvious that in order to be able to throw the nut in gear with the screw the slide has to be brought in the required position in relation to said screw, and unless this is the case the threads of the nut will ride on those of the screw.

In cutting screws the tool is secured in the rest $d$, and after the gear has been adjusted according to the pitch of the thread to be cut, the slide is moved down to the loose head-block E, and locked by depressing the hand-lever $b$, and the lathe is started. When the tool has passed over the length of the rod on which the screw is to be cut, the tool has to be moved back so that its point does not touch the work, and the slide is moved back toward the loose head-block in order to take a new cut. In order to effect this purpose by hand and in a short time, the nut $a$ is thrown out of gear with the screw, and by turning the hand-wheel F in the proper direction the slide is rapidly moved from one end of the lathe to the other. Before the second cut can be taken, however, the slide has to be locked, which cannot be done unless the nut $a$ is brought in the proper position in relation to the screw C; and, furthermore, the point of the tool has to be exactly opposite the previous marks or cuts on the rod on which the thread is to be cut. This double object is effected by the aid of the worm-wheel G, dial H, and index I. The worm-wheel rotates freely on an axle, $e$, which has its bearings in an arm projecting from the slide D, and its teeth mesh into the threads of the screw C. The number of teeth in the worm-wheel is a multiple of the number of threads in the running inch of the screw, and the axle $e$ extends through the arm of the slide and bears the dial $f$. This dial is composed of a series of points, the number of which, when multiplied with the number of threads on the running inch of the main screw, will produce the number of the teeth of the worm-wheel. For instance, if the screw has ten threads to the inch, and the worm-wheel thirty teeth, the number of points of the dial must be three.

At the beginning of the operation, when the slide is locked and the tool in position, one of the points of the dial is placed opposite the index I, which projects from the edge of the slide, and the lathe is started. If the tool has run over the whole distance of the screw to be cut, the slide is unlocked and turned back to the starting-point, and whenever one of the points of the dial comes opposite to the index the nut $a$ is in the proper position to engage with the thread of the main screw, and the tool is exactly opposite the previous mark or cut on the rod, so that a second cut can be taken without further trouble or loss of time.

If desired, the worm-wheel G might be replaced by a bevel-pinion mounted on the screw and gearing in a bevel-wheel running on a stud projecting from the shears.

Having thus described my invention, I claim as new and desire to secure by Letters Patent—

The combination of the worm-wheel G, dial H, index I, screw C, and slide D, constructed and operating substantially as and for the purpose set forth.

JOHN G. BAKER.

Witnesses:
A. H. SHOEMAKER,
JAS. ALTEMEY.